United States Patent [19]
Jannson et al.

[11] Patent Number: 5,153,670
[45] Date of Patent: Oct. 6, 1992

[54] HOLOGRAPHIC LIPPMANN-BRAGG FILTER IN A SPECTROSCOPIC SYSTEM

[75] Inventors: Tomasz P. Jannson; Joanna L. Jannson, both of Torrance; Michael T. Feeney, Hacienda Heights, all of Calif.

[73] Assignee: Physical Optics Corporation, Torrance, Calif.

[21] Appl. No.: 464,116

[22] Filed: Jan. 12, 1990

[51] Int. Cl.$^5$ .............................. G01J 3/44; G02B 5/32
[52] U.S. Cl. ....................................... 356/301; 359/15
[58] Field of Search ............... 350/3.7, 3.6; 359/1, 359/3, 15; 356/301, 302, 303, 311, 300, 319, 326, 331

[56] References Cited

U.S. PATENT DOCUMENTS

| | | | |
|---|---|---|---|
| 4,063,818 | 12/1977 | Lepere | 356/100 |
| 4,068,953 | 1/1978 | Harney et al. | 356/301 |
| 4,127,329 | 11/1978 | Chang et al. | 356/301 |
| 4,195,930 | 4/1980 | Delhaye et al. | 356/301 |
| 4,455,088 | 6/1984 | Koike | 356/334 |
| 4,958,892 | 9/1990 | Jannson et al. | 350/3.6 |

OTHER PUBLICATIONS

Kogelnik, H., "Coupled Wave Theory for Thick Hologram Gratings", *The Bell System Technical Journal*, vol. 48, No. 9, Nov. 1969, pp. 2909-2947.

Southwell, W. H., "Using Apodization Functions to Reduce Sidelobes in Rugate Filters", *Applied Optics*, vol. 28, No. 23, Dec. 1, 1989, pp. 5091-5094.

Collier, R. J., Burckhardt, C. B. and Lin, L. H., *Optical Holography*, Academic Press, 1971, pp. 228-264.

Jansson, J., Jannson, T. and Yu, K. H., "Solar Control Tunable Lippmann Holowindows", *Solar Energy Materials*, vol. 14 (1986) 289-297.

*Primary Examiner*—Bruce Y. Arnold
*Assistant Examiner*—David R. Parsons
*Attorney, Agent, or Firm*—Nilles & Nilles

[57] ABSTRACT

A holographic filter comprises a volume hologram recorded with Bragg surfaces for use in spectroscopic and spectral splitting applications. The Bragg planes in the holographic filter can be recorded to satisfy virtually any design constraint imposed upon the filter such as Raman, Lippmann, non-Snellian (slanted), curved, and multiplexed spectral filters. The holographic filter achieves maximal reduction of secondary maxima and sidelobes and obtains large wavelength selectivities, and varied grating constants.

6 Claims, 12 Drawing Sheets

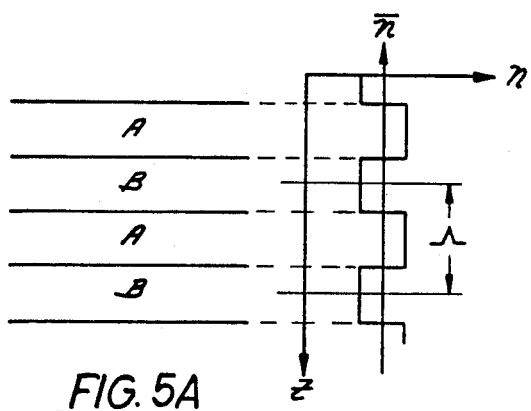
FIG. 5A
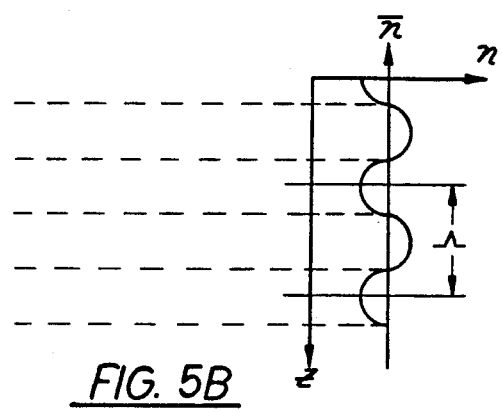
FIG. 5B
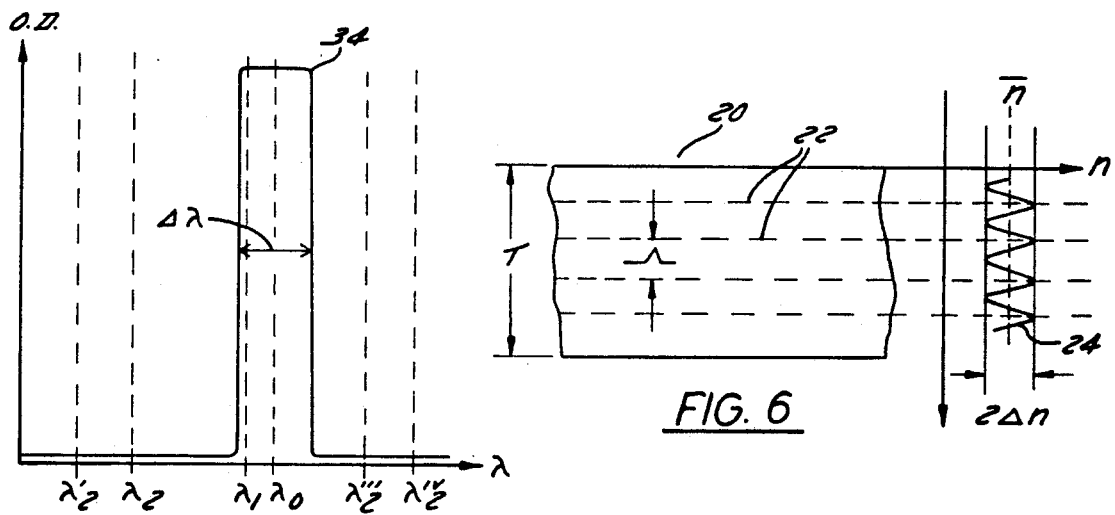
FIG. 8
FIG. 6
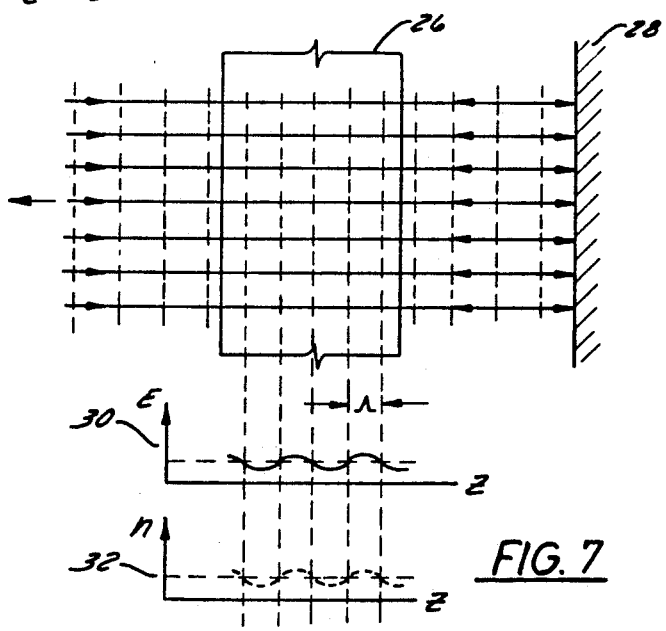
FIG. 7

| T | 1.6μ | 8μ | 16.1μ | 33μ |
| N | 10 | 50 | 100 | 200 |
| Δλ | 100 NM | 20 NM | 10 NM | 5 NM |

HOLOGRAPHIC LIPPMANN-BRAGG FILTER IN A SPECTROSCOPIC SYSTEM

BACKGROUND OF INVENTION

1. Field of Use

This invention relates generally to wavelength selective filtering of light. More specifically, this invention concerns holographic filters used in spectroscopic and spectral splitting applications.

2. Description of the Prior Art

Devices used to filter out or inhibit the transmission of certain wavelengths of light are in widespread use, and have several particularly important applications. One important application is that of spectrophotometers which are able to determine the chemical composition of a material by illuminating it with a broad wavelength range of light waves. In such devices, light is generated by a source and dispersed and collimated by an imaging system. A slit is moved within the system which determines the wavelength of light to be measured.

The quality of a spectroscopic device depends primarily on two factors. Resolution of the device determines the width of the spectral line that the spectrophotometer will be able to discern. Resolution is directly dependent upon the size of the slit which is usually better than one nanometer in high quality devices. The maximum optical density ("O.D.") is another critical quality parameter of spectroscopic devices. Spectrophotometers of good quality are able to measure O.D.'s of up to 4.0 and sometimes more. O.D.'s of up to 4.0 are difficult to measure because they represent four orders of magnitude attenuation of the incident light intensity. To measure such a large range of O.D. requires that the noise in the system from all sources be very low. Noise is picked up from every conceivable source including ambient light and the electronics in the spectroscopic system itself.

One type of spectrophotometer is the absorption spectrophotometer wherein the composition of the specimen is determined by measuring the light absorbed by the specimen. A logarithmic scale is used to plot absorption in order to accommodate the several orders of magnitude of O.D. O.D. is represented by the following equation $$O.D. = -\log_{10} T$$

where T represents the transmission coefficient of the material sample. For example, if T equals $10^{-4}$, O.D. equals 4.0 Referring to FIG. 1, O.D. is plotted against wavelength $\lambda$. It can be seen that where the curve in FIG. 1A reaches its maximum near the wavelength $\lambda_O$, the material is optically dense and indicates that the specimen in the spectrophotometer has absorbed the range of wavelengths surrounding $\lambda_O$. The counterpart to the O.D. versus $\lambda$ curve is illustrated in FIG. 1B. FIG. 1B plots T, the transmission coefficient against wavelength $\lambda$. It can be seen that all wavelengths of the light source are transmitted by the specimen except for the range of wavelengths about the wavelength $\lambda_O$. Note that the typical measurement of light absorbed by a specimen is a rather complex curve as can be seen in FIG. 1C. Simplified curves such as those in FIGS. 1A and 1B will be used throughout for simplicity.

There exists a certain class of spectroscopy called laser spectroscopy. In laser spectroscopy a laser beam having wavelength $\lambda_0$ is used rather than some wider source beam. In laser spectroscopy the laser beam is incident upon a scattering medium of interest which, according to its chemical composition, will scatter the laser beam into multiple beams some of which have the same wavelength as the incident beam and some of which have a different scattered wavelength. Referring now to FIG. 2 a laser beam $\lambda_0$ is incident upon scattering medium S. The incident beam is scattered into a multiplicity of light waves each having a scattered wavelength $\lambda_S$. It can be seen that the wavelength of some of the light waves $\lambda_S$ is equal to $\lambda_0$ and the wavelength of other $\lambda_S$ light waves is not equal to $\lambda_O$. The scattered light waves whose wavelength is $\lambda_0$ can be said to have undergone elastic scattering. The scattered light waves whose wavelength is not equal to $\lambda_O$, can be said to have undergone inelastic scattering.

Elastic scattering means that the scattered light photons have the same energy as the incident light photons. Elastic scattering is by far the stronger of the two scattering effects and thus the scattered energy to be measured is usually heavily biased toward the $\lambda_s = \lambda_0$ light waves. On the other hand, inelastically scattered light photons usually have less energy than the $\lambda_0$ light photons. The energy of these light photons can be described by the following equation $$E_p = hf = hc/\lambda$$

where $E_p$ is photon energy, h is Planck's constant, f is the frequency in Hertz of the light wave, c is the velocity of light in a vacuum, and $\lambda$ is the wavelength of the light in a vacuum. Ep for the inelastic scattering case is less than $E_p$ for elastic scattering.

The technological challenge of filtering in laser beam spectroscopy arises from the fact that it is the inelastically scattered wave that contains more information about the chemical structure of the material under test and consequently is the desired signal. Scattered light waves having energy $E_P$ equal to the energy of the $\lambda_0$ light wave thus constitute noise and must be filtered out, along with the multiplicity of other noise sources so that the desired inelastically scattered signal energy can be measured with accuracy. Filters are needed to block the $\lambda_0$ wavelength light wave. The most common are Raman filters used for Raman spectroscopy applications.

Wavelength selective optical filters have basically been of two types, absorption dyes and dielectric multilayers. The advantages of absorption dyes as wavelength selective optical filters is primarily their high angular acceptance of nearly $\pm 90°$. This means that light incident upon the filter at most any angle will be filtered. The disadvantages of absorption dyes stem from the fact that absorption dyes have their own chemical structure and thus their own absorptive characteristics which can affect the absorption measurement from the specimen. Additionally, absorption dyes have rather broad bandwidths and, consequently, have low wavelength selectivity, i.e. bandwidth is usually higher than 20 nm. Furthermore, absorption dyes have secondary maxima due to their sophisticated chemical composition that can be confused with the absorption lines of the specimen. Finally, the disadvantage of an absorption dye stems from what is usually its strong point, broad angular acceptance. This strong point can be a disadvantage where the specimen is tested for angular selectivity.

The second type of known wavelength selective optical filter is the dielectric multilayer. Dielectric multilayer filters operate on the principle of Bragg interference. Bragg interference filters operate on the principle that for certain wavelengths near $\lambda_O$, the reflected waves interfere constructively with each other and so have a high reflectivity for wavelengths in the vicinity of $\lambda_O$. For other wavelengths, the reflected waves interfere destructively. Dielectric multilayer filters are usually used as reflection filters. A dielectric multilayer filter is shown in FIG. 3A having alternating dielectric layers made from materials A and B.

There is another type of filter called a Fabry-Perot etalon, however, which is a transmission filter based on interference principles. Fabry-Perot etalon filters transmit some wavelengths and reject all others in contradistinction to reflection type filters which reflect only certain wavelengths and transmit all others. A Fabry-Perot etalon (transmission) filter is shown in FIG. 3B and has a first coating C' comprising dielectric multilayers (not shown) similar to those in FIG. 3A separated from a second coating C'' comprising similar alternating dielectric layers. In essence, the Fabry-Perot etalon is a combination of two highly parallel multilayer dielectric coatings and operates by causing interference of the light waves between the two coatings.

A transmission plot for a dielectric multilayer filter is shown in FIG. 4A which illustrates that the filter transmits all wavelengths except those around $\lambda_O$. A transmission plot for a Fabry-Perot etalon transmission filter is shown in FIG. 4B which illustrates that the filter transmits wavelengths around $\lambda_{01}, \lambda_{02}, \lambda_{03} \ldots \lambda_{On}$.

The wavelength selectivity of dielectric multilayer filters is directly dependent upon the number of layers in the filter. The critical importance of this is fully discussed infra. Vacuum deposition is used to produce these filters, by evaporating layer after layer of alternating dielectric materials. Each layer adds to the cost of the filter. Furthermore, the cost of physically larger dielectric multilayer filters becomes prohibitive due to the size of the required vacuum chamber in which the filters are made.

An additional disadvantage of this type of filter is that the rectangular periodic distribution of its refractive index n creates unwanted harmonics and secondary maxima. Certain of the harmonics, particularly the second harmonic, can be suppressed, but other harmonics and secondary maxima remain which can affect the performance of the filter. The secondary maxima, similar to those shown in FIG. 4A, are especially problematic from the standpoint of spectroscopic system accuracy because they can be confused with the absorption spectral lines characterizing the chemical structure of the sample. FIG. 5A shows the variation of the refractive index n for a typical multilayer dielectric filter having alternating dielectric layers A and B. It can be seen that the refractive index n is a rectangular function over the several layers of the filter, and has an average refractive index $\bar{n}$, and the grating constant $\Lambda$. The grating constant can be described by the equation $$\Lambda = \lambda/2\bar{n}$$

Dielectric filters can be made to have a more sinusoidal variation of refractive index n, but the cost of such filters, called rugate filters, is extremely high. FIG. 5B depicts the sinusoidal refractive index profile of a rugate multilayer dielectric filter.

Due to the disadvantages of both the absorption dye and multilayer dielectric filters, and especially the high cost of the latter, there is a need for a filter for use in spectroscopic applications that has extremely high rejection, high wavelength selectivity, high angular acceptance, minimized secondary maxima, and which can be manufactured at low cost.

SUMMARY OF THE INVENTION

A filter for use in spectroscopic applications comprising a volume hologram is presented. Specifically, a volume hologram recorded with Bragg planes according to state of the art techniques which operates according to the Bragg interference principle is disclosed. The Bragg planes in the holographic filter of the present invention can be recorded to satisfy virtually any design requirement imposed upon the filter such as for Raman filter, Lippmann filter, curved Bragg surface filter, and multiplexed filter applications. The Bragg planes of the holographic filter may be recorded in a one step recording process and can be varied to concentrate, focus, or direct the unwanted wavelength components of the laser light source where desired.

The holographic filter of the present invention can be manufactured at low cost and can obtain high optical densities of 4.0, 5.0, and 6.0, large controllable bandwidths and wavelength selectivities, refractive index profiles to meet a broad range of frequency, amplitude and bias requirements, and with extremely high resolution and stability. Most importantly the holographic filter of the present invention may have extremely narrow wavelength rejection characteristics (i.e., the space under the O.D.-$\Lambda$ curve can be made very narrow). Furthermore, the strength of the rejection coefficient, O.D., can be made extremely high, and the secondary maxima of the holographic filter can be suppressed considerably and/or compressed to lessen their effect. In a single holographic filter of the present invention, the the average index of refraction, $\bar{n}$, can be varied as a function of z, making the holographic filter of the present invention not only low cost but highly flexible.

BRIEF DESCRIPTIONS OF THE DRAWINGS

Figure 1A:
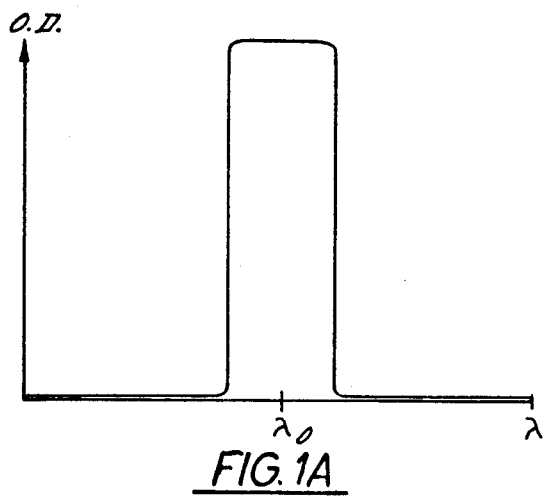
FIGS. 1A and 1B show the relationship between optical density (O.D.) and the transmission coefficient T versus wavelength $\lambda$ respectively
Figure 2:
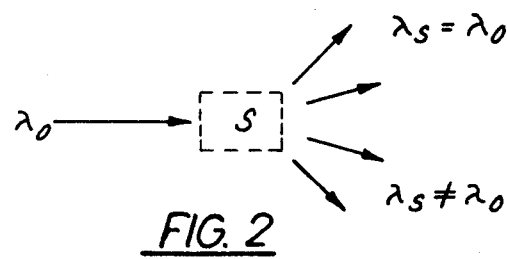
FIG. 2 illustrates the scattering of a laser beam by a scattering medium.
Figure 1B:
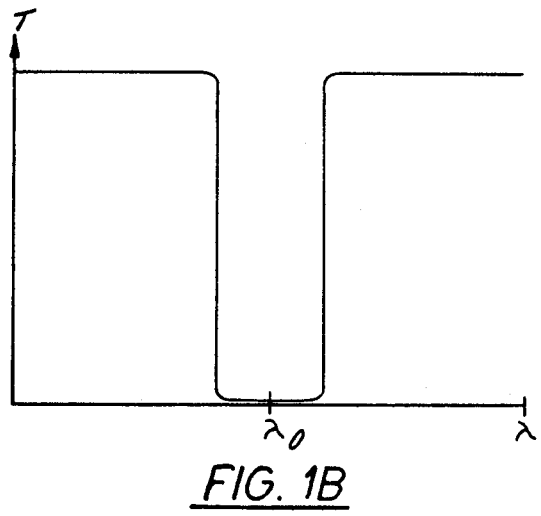
Figure 3A:
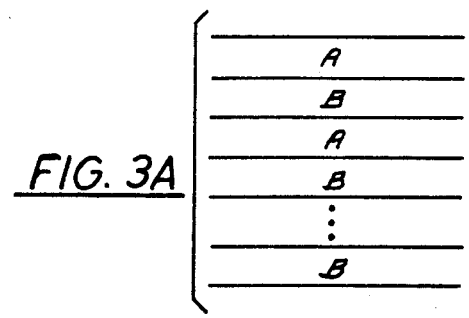
FIGS. 3A and 3B show respectively, a multilayer dielectric reflection filter and a Fabry-Perot etalon filter.
Figure 1C:
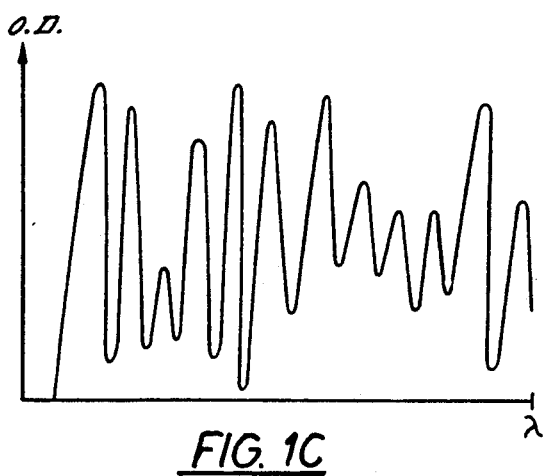
FIG. 1C is a typical plot of O.D. versus $\lambda$ measured by a spectrophotometer.
Figure 3B:
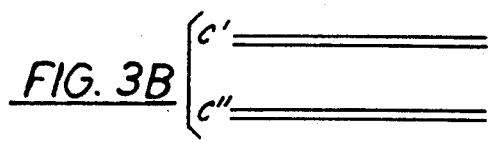
Figure 4A:
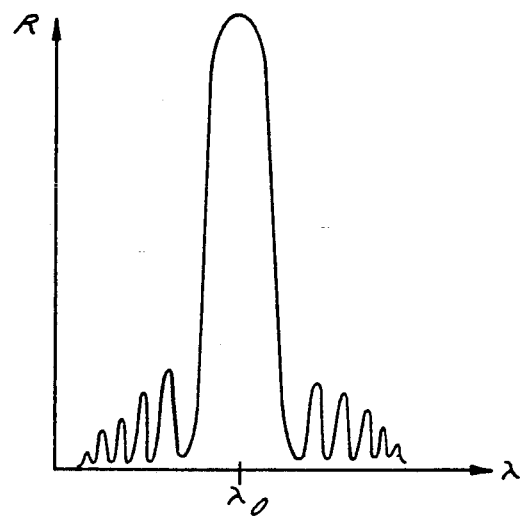
Figure 4B:
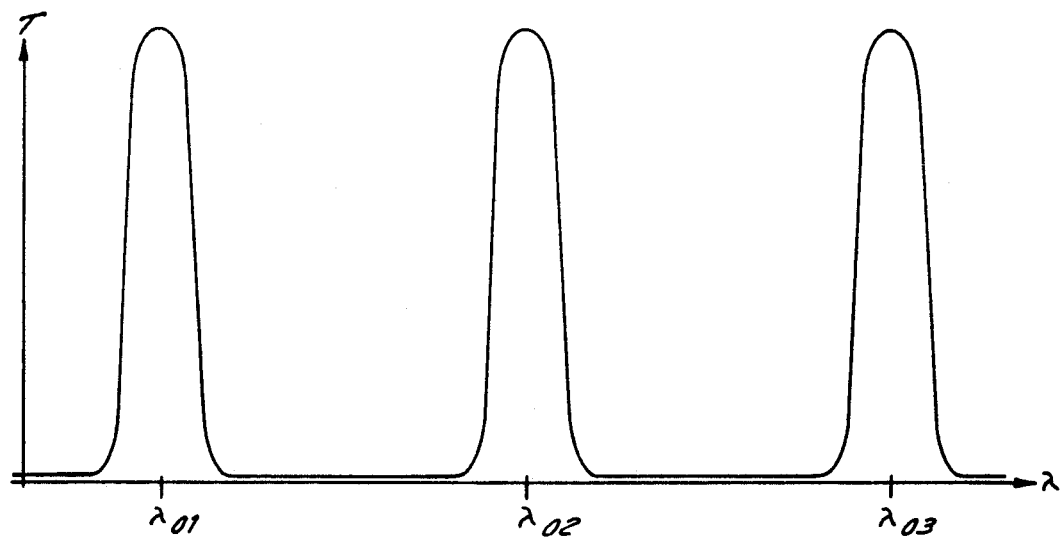
Figure 9A:
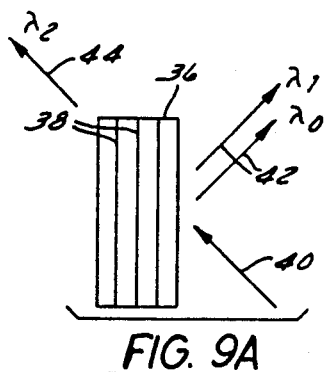
Figure 11A:
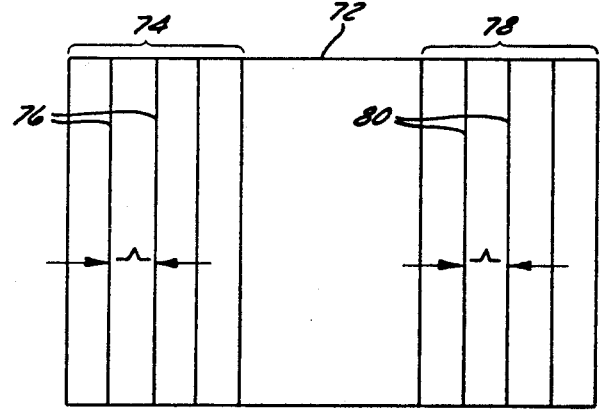
Figure 11B:
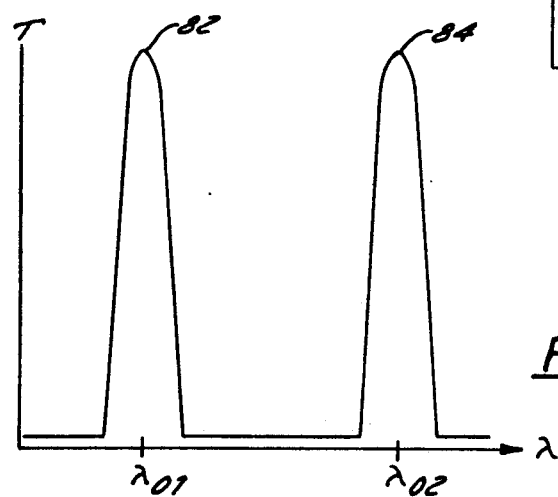
Figure 10A:
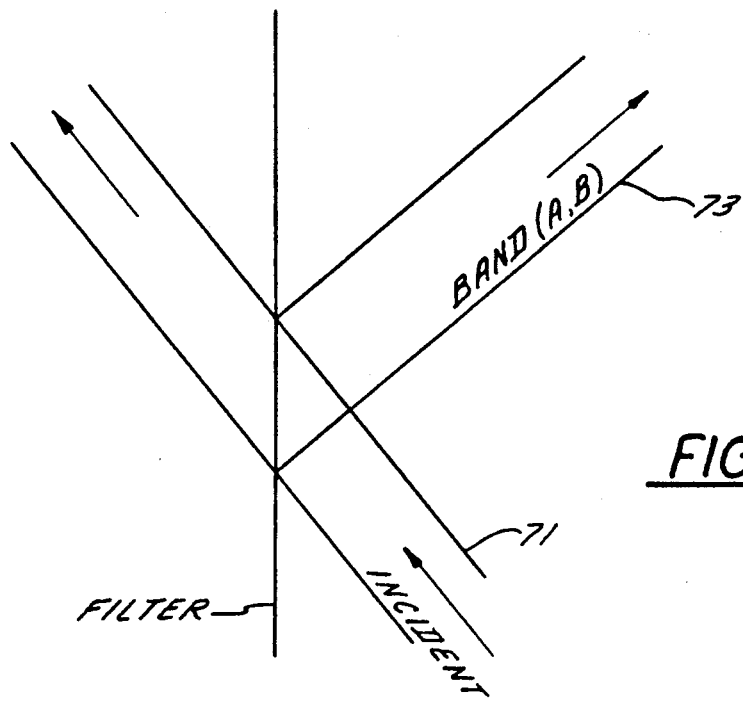
Figure 10B:
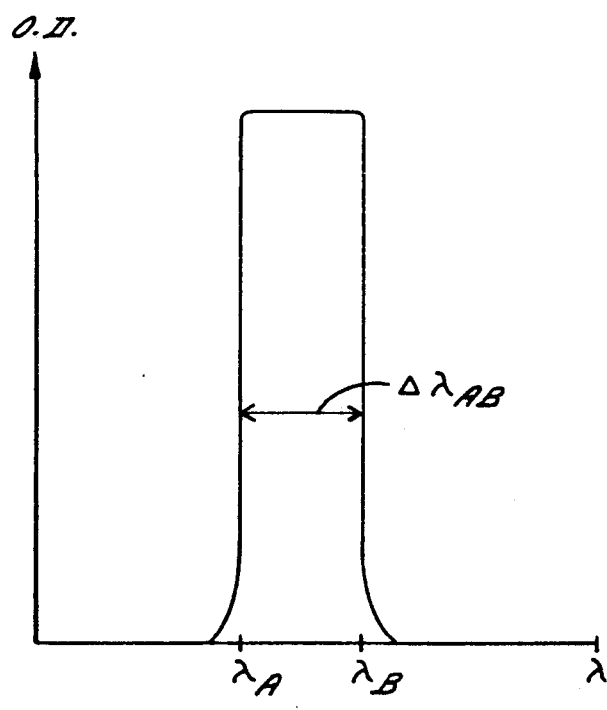
Figure 13C:
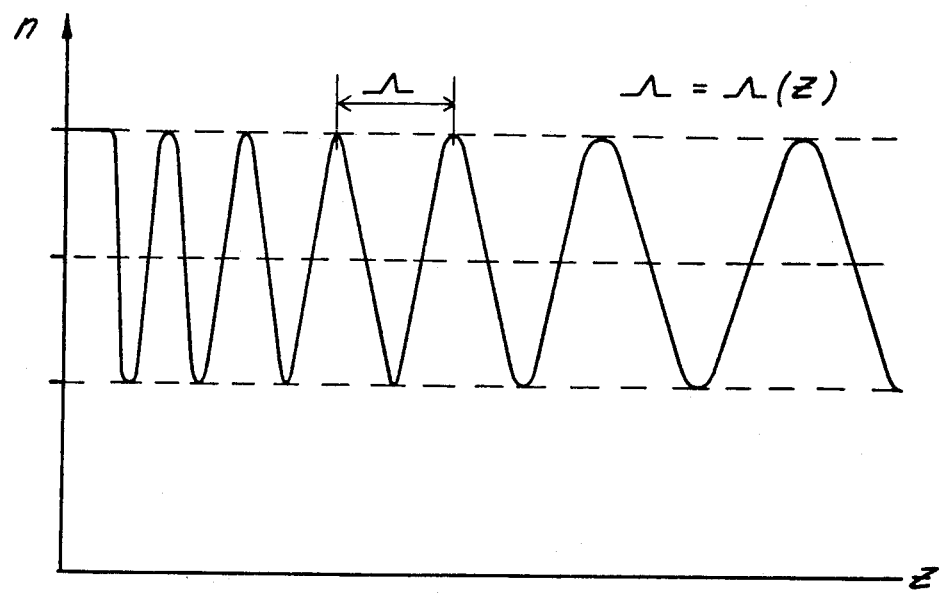

FIGS. 4A and B show respectively, the reflection coefficient R for a multilayer dielectric filter and the transmission coefficient T for a Fabry-Perot etalon filter versus $\lambda$;

FIGS. 5A and B show the quadratic periodic nature of the refractive index n for a multilayer dielectric filter and the sinusoidal nature of the refractive index n for a rugate multilayer dielectric filter;

FIG. 6 is a schematic of a holographic filter of the present invention and the variation in the refractive index n;

FIG. 7 is a schematic of a Lippmann hologram undergoing recording;

FIG. 8 shows the desired light wave $\lambda_2$ and the light waves $\lambda_0$ and $\lambda_1$ to be filtered out in a plot of O.D. versus $\lambda$;

FIGS. 9A, B, C, and D are exemplary schematics of holographic optical elements in the form of filters of the present invention having varying Bragg plane structures: Lippmann, slanted, diverging in reflection, and focusing in transmission, respectively;

FIGS. 10A and B are schematics of a polychromatic beam incident a filter of the present invention in a spectral splitting application and its O.D. curve;

FIG. 11A is a schematic of a holographic Fabry-Perot etalon filter and FIG. 11B is its transmission characteristic T versus $\lambda$.

Figure 12:
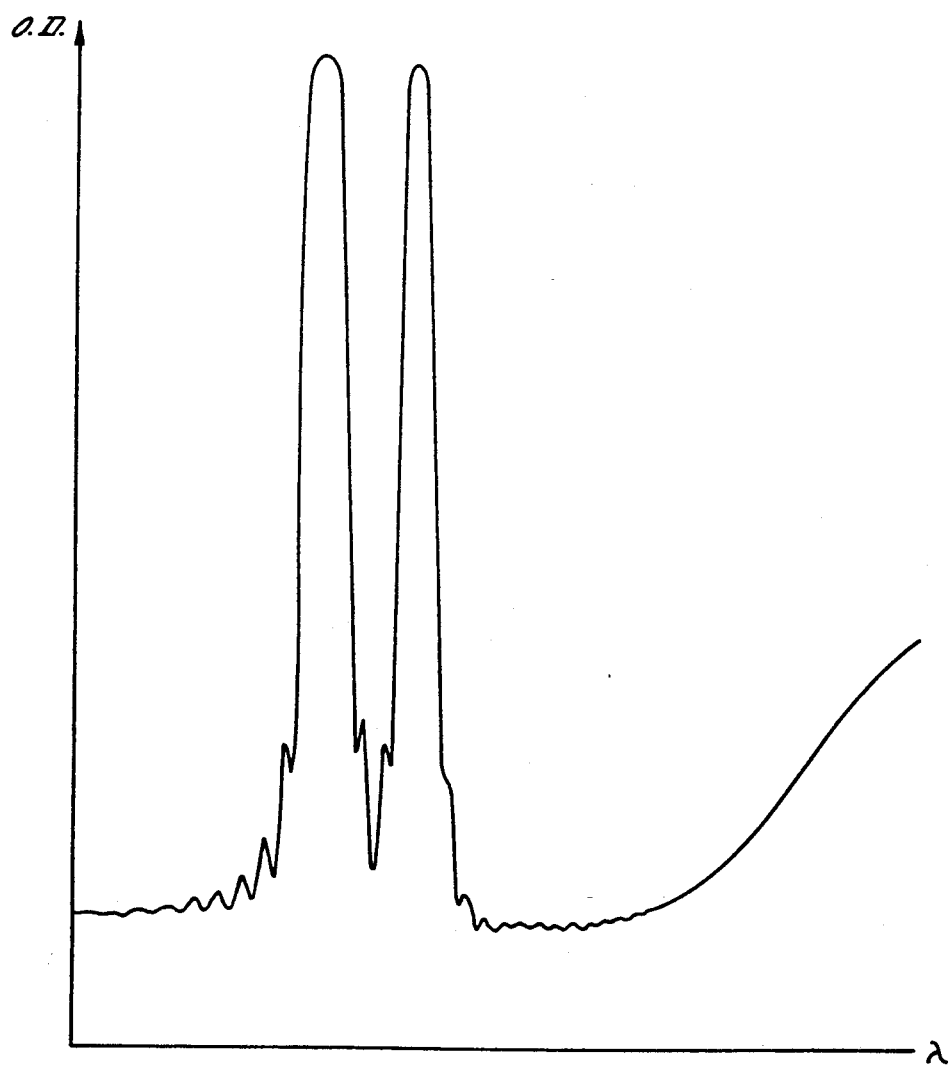
Figure 13B:
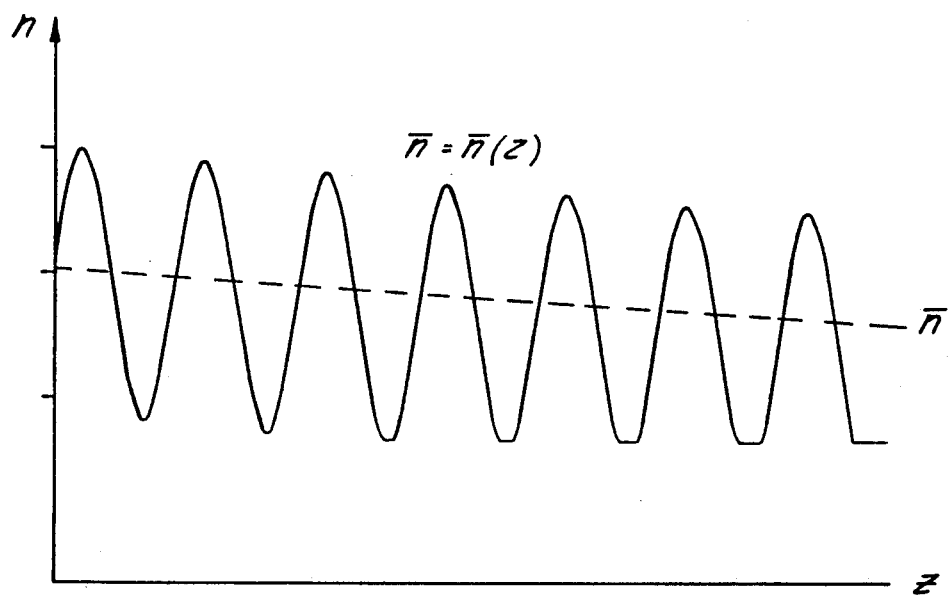
Figure 13A:
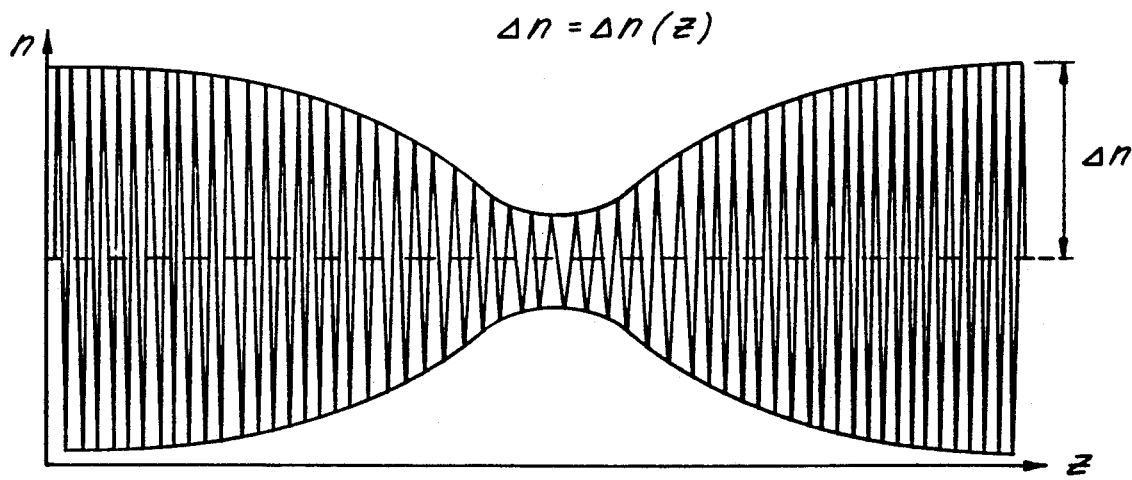

FIG. 12 is a schematic of the rejection characteristics of a multiplexed Lippmann holographic filter;

FIGS. 13A and B and C show varying refractive index profiles for holographic filters of the present invention having varying amplitude, bias, and grating constant respectively wherein n is plotted against z.

Figure 14:
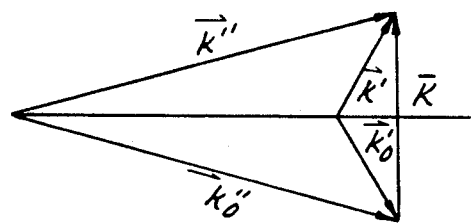
Figure 15:
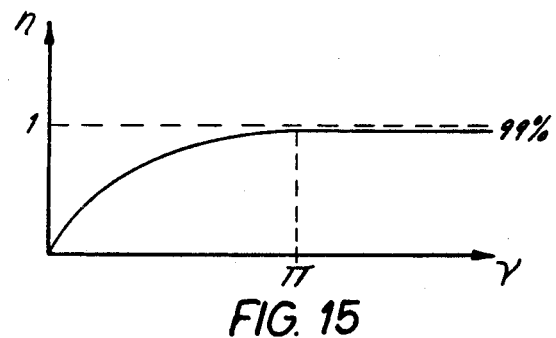
Figure 16A:
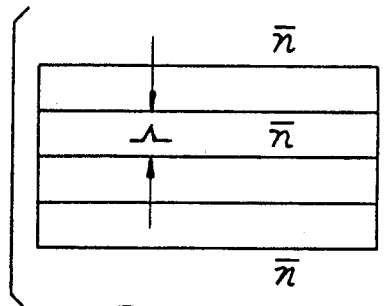
Figure 16B:
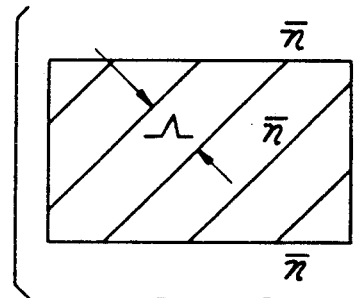
Figure 17:
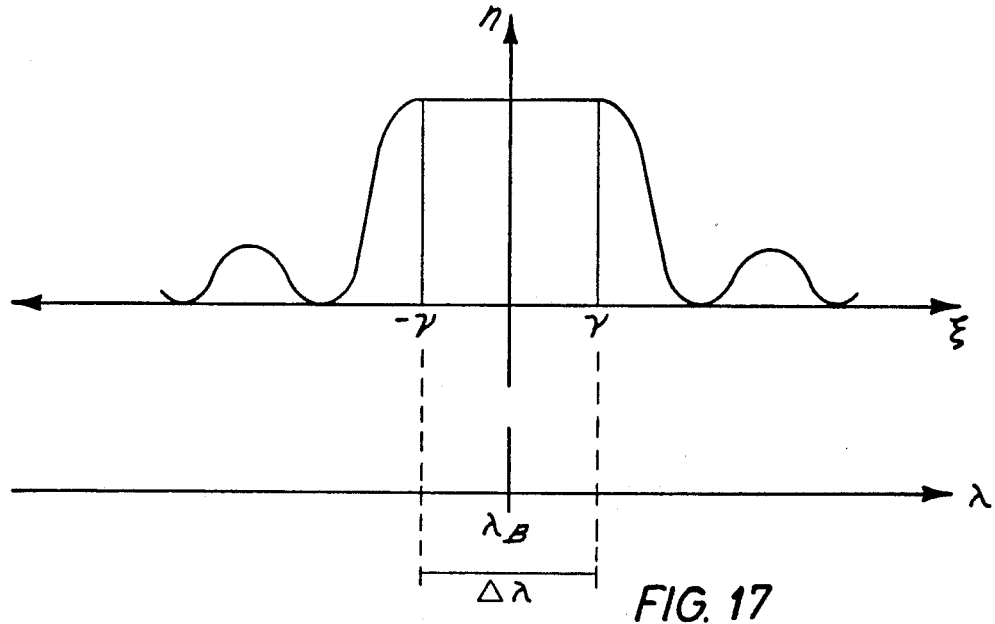
Figures 18, 19:
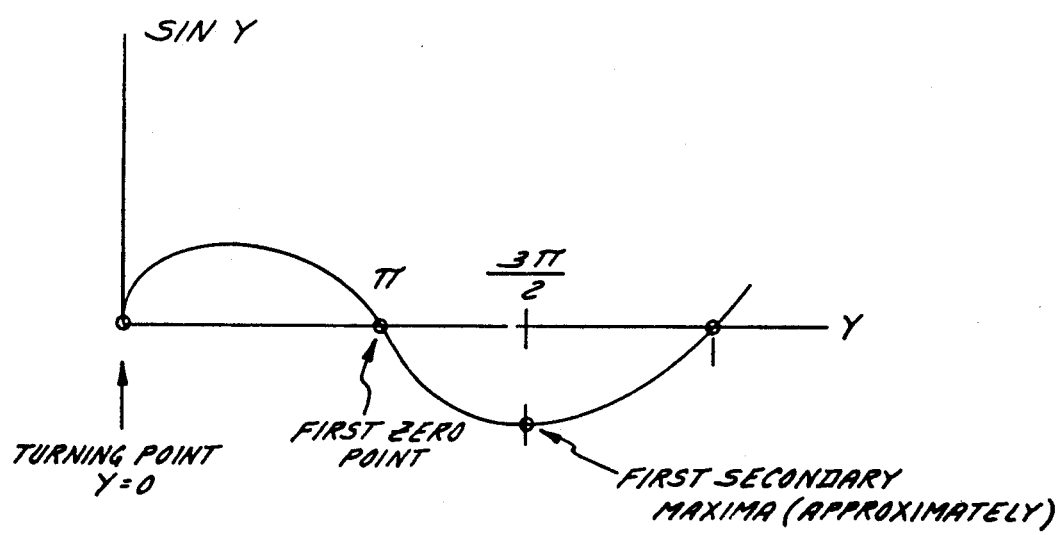
Figure 20A:
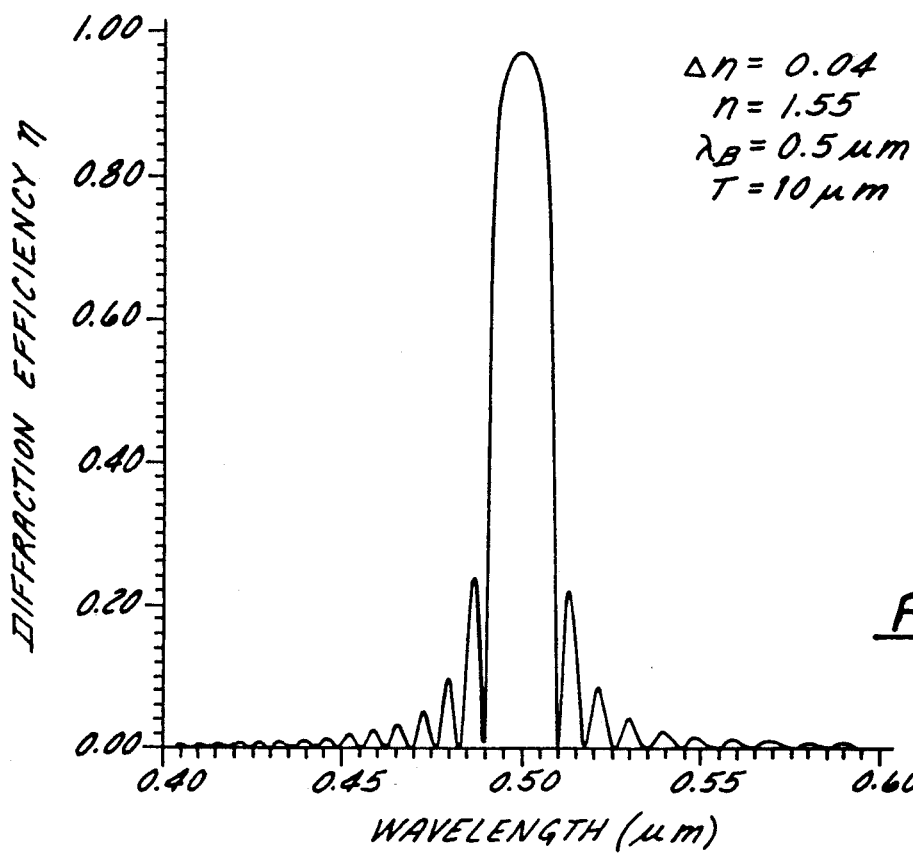
Figure 20B:
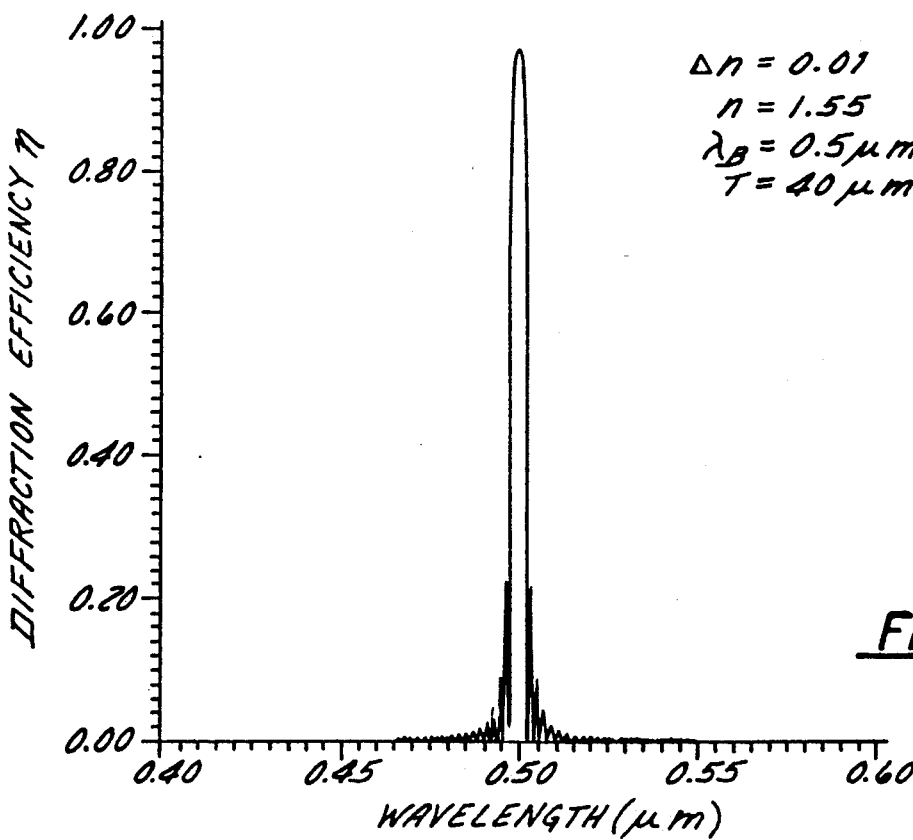
Figure 21A:
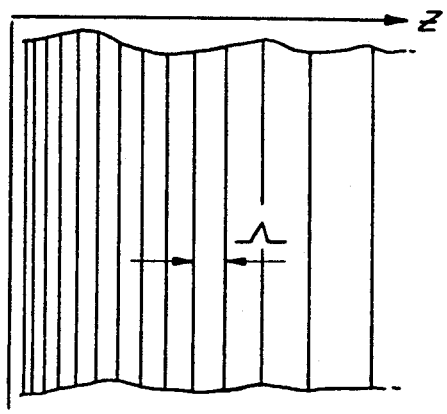
Figure 22:
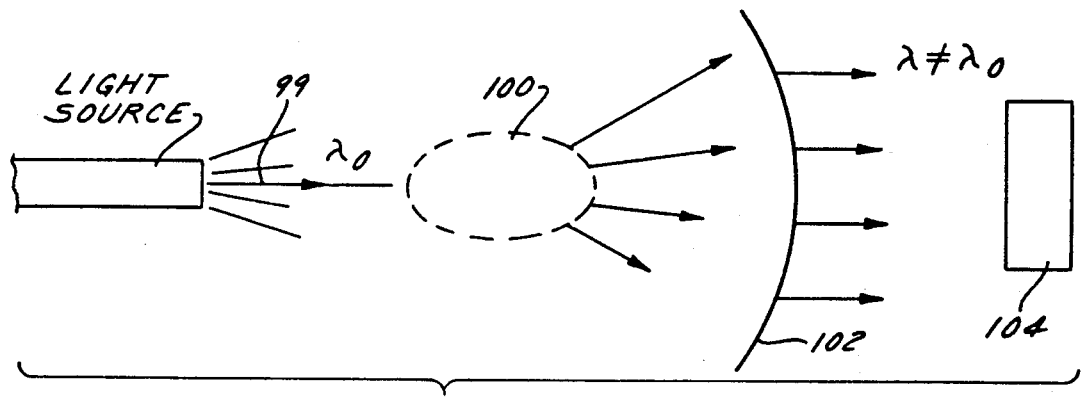
Figure 23:
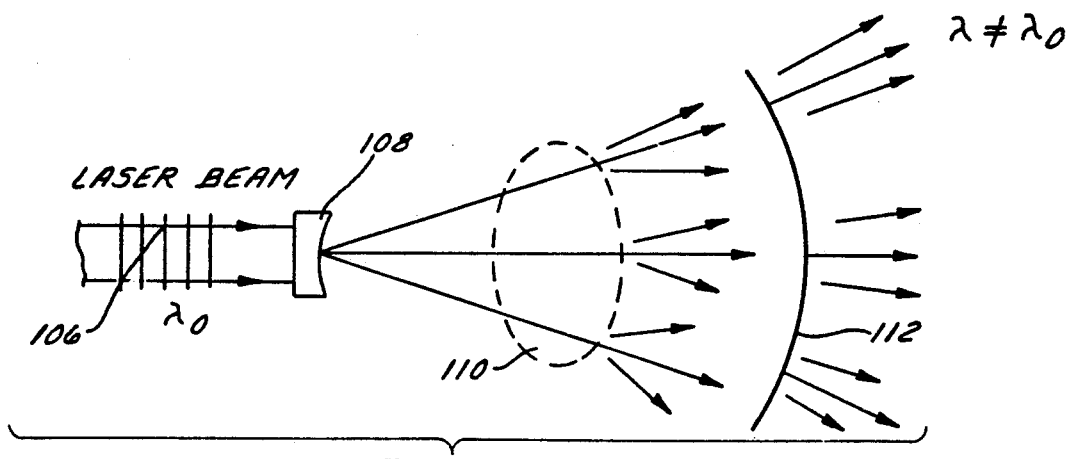
Figure 24:
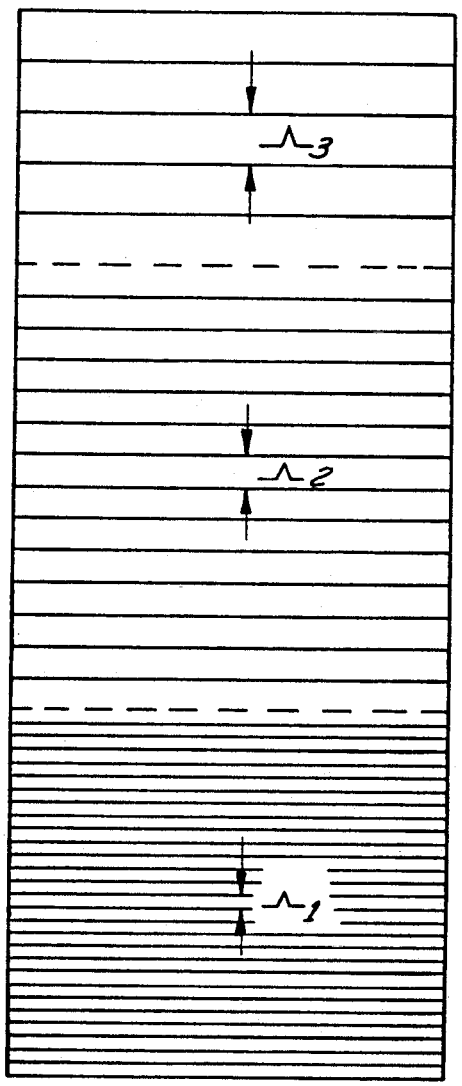
Figure 25:
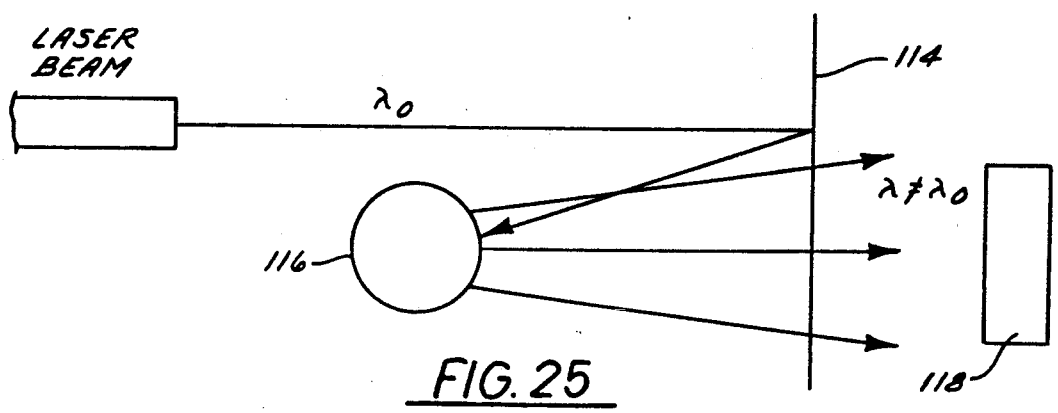

FIG. 14 shows the wave vector $\bar{k}$ and grating vector $\bar{K}$ for a light wave in a medium for the on-Bragg condition;

FIG. 15 shows the relationship between $\rho$ coupling efficiency, and $\upsilon$, the coupling constant, for a rejection holographic filter of the present invention;

FIGS. 16A and B show fully uniform Kogelnik holographic filters of the present invention;

FIG. 17 shows the relationship between $\rho$ and $\xi$, and the turning points $\pm \upsilon$;

FIG. 18 is a table showing numerical values for T (thickness), N (number of layers), and $\Delta\lambda$ (bandwidth);

FIG. 19 shows a sin curve and the location of the turning points, first zero, and first secondary maxima of the equation defining $\xi$;

FIGS. 20A and B are graphs showing $\rho$ and $\lambda$ where the secondary maxima are uncompressed and compressed respectively;

FIGS. 21A and B show a filter of the present invention having a varying grating constant $\Lambda$ and its O.D. curve;

FIG. 22 is a schematic of one embodiment of the present invention utilizing a curved filter;

FIG. 23 is another embodiment of the invention;

FIG. 24 is a schematic of a compound holographic filter of the present invention;

FIG. 25 is yet another embodiment of the present invention.

DESCRIPTION OF THE PREFERRED EMBODIMENT

Referring to FIG. 6, a holographic Lippmann filter 20 of the present invention is depicted. The holographic filter 20 is manufactured in accordance with state-of-the-art recording, exposure, and processing techniques. Bragg planes 22 are recorded in the volume of the holographic filter 20. The grating constant A is shown as the distance between Bragg planes 22. The thickness T of the holographic filter is also shown. The refractive index n varies as shown by curve 24 and $\Delta n$ represents the amplitude of the refractive index $\Delta n$. Typical values for the lower limit of n for example, might be 1.49 and its upper limit might be, for example, 1.51 with an average n, $\bar{n}$, of 1.50; then $\Delta n=0.01$.

Referring now to FIG. 7 the recording of a holographic Lippmann filter of the present invention is explained. The holographic material 26 to be recorded, such as DCG, DCG polymer grafts and/or composites, PVA, PMMA, and such materials as DuPont photopolymer or Polaroid DMP-128, is set up adjacent to a mirror 28 and exposed to laser light of wavelength $\lambda$. The laser light incident upon the holographic material 26 is also incident upon the mirror 28 which reflects the laser energy and creates a standing wave pattern in the holographic material 26. The electromagnetic energy present in the standing wave is shown by the plot 30, E versus z. The spacing of the Bragg planes, $\Lambda$, is determined by the wavelength of the laser light and the average refraction index $\bar{n}$ of the material to be recorded according to $$\Lambda = \lambda/2\bar{n}.$$

The sinusoidal variation of the electromagnetic energy as shown in plot 30 causes the refractive index n of the material to change in direct relation to the standing wave of electromagnetic energy in the material 26. The variation in refractive index n is shown in plot 32 of n versus z. It can be seen that refractive index n varies as does the electromagnetic energy E. Where the electromagnetic energy E in the standing wave in the material 26 is high, so is the refractive index n and where energy E is low, the refractive index n is low as well. Thus, the recording process may create in the holographic material to be recorded in the material 26 a sinusoidal variation in the refractive index of the material. As is shown infra, the refractive index of the material can be varied broadly during recording to yield variations in the spacing of the Bragg-planes, $\Lambda$, the shape of the refractive index variation (sinusoidal to quasi-rectangular), the amplitude, $\Delta n$, of the index of refraction in the material, and its bias, $\bar{n}$, from one end of the material to the other. The more advanced HOE (holographic optical element) filters may be recorded by using standard two beam interference techniques described in R. Collier, et. al., Optical Holography, Academic Press (1971).

Referring now to FIG. 8, a curve 34 depicting optical density (O.D.) versus $\lambda$ for a holographic filter is presented. The curve 34 represents the wavelengths that are rejected by the holographic filter. The central wavelength of the rejected wavelengths is $\lambda_O$. $\lambda_1$ represents another wavelength not equal to $\lambda_0$ that is also rejected, and $\lambda_2$ represents a wavelength that is not rejected by the filter, i.e., is transmitted. Since the specimen usually has a very sophisticated chemical structure, there is a broad set (usually continuous set) of wavelengths to be measured (say, $\lambda_2'$, $\lambda_2''$, $\lambda_2'''$, etc.), and $\lambda_2$ is only one of them. Each of these wavelengths, however, should be outside the bandwidth of rejection. In a laser beam spectroscopy system where an incident light beam $\lambda_0$ is scattered by a scattering medium, $\lambda_0$ and $\lambda_1$ would represent elastic or virtually elastic scattering of the laser light beam. $\lambda_2$ represents inelastic scattering. It is the signal having wavelength $\lambda_2$, a wavelength outside the range of wavelengths near $\lambda_O$, that is the signal of interest and represents information about the chemical structure of the specimen. All other signals may be filtered out.

Referring now to FIGS. 9A, B, C and D, it can be seen that the positioning of the Bragg surfaces in a holographic filter of the present invention can be varied during the recording process to direct either the desired signal ($\lambda_2$) or the undesired signal ($\lambda_O$, $\lambda_1$) in particular directions. Those more advanced volume holograms are usually called holographic optical elements (HOE's). They combine spectral filtering operations with focusing, diverging, imaging, etc. FIG. 9A represents a Lippmann-Bragg holographic filter mirror 36 having Bragg planes 38 parallel to the surface of the mirror. An incoming laser beam 40 is incident upon the mirror 36 and is in part reflected and in part transmitted by the holographic filter mirror 36. The reflected portion 42 comprising light waves $\lambda_0$ and $\lambda_1$ of the incoming laser beam 40 represents elastic scattering. Inelastic scattering is represented by light wave 44 of the incident laser beam that is transmitted through the holographic filter mirror 36. The inelastically scattered portion has wavelength $\lambda_2$ outside of the range of rejection of the mirror 36. Note that the angle of the rejected beam 42 with respect to the holographic filter mirror 36 is the same as the angle of the incoming laser beam 40 with respect to the holographic filter mirror 36.

Figure 9B:
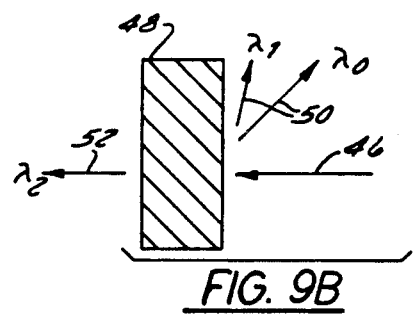

Referring now to FIG. 9B, an incoming laser beam 46 having wavelength $\lambda_0$ is incident a non-Snellian (slanted) holographic filter 48. A portion 50 of incoming laser beam 46 is rejected by elastic or quasi-elastic scattering and comprises the wave components $\lambda_0$ and $\lambda_1$. Since the Bragg planes are not parallel to the surface of the hologram neither of the reflected waves satisfy Snell's law. Another portion 52 of the incoming laser beam 46 is inelastically scattered, is transmitted, and has a wavelength of $\lambda_2$.

Figure 9C:
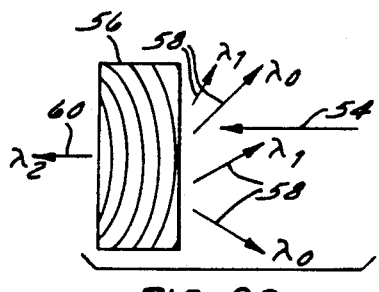

Referring now to FIG. 9C, a diverging (in reflection) holographic filter is depicted having an incoming laser beam 54 with wavelength $\lambda_0$ at normal incidence to a HOE mirror 56. Elastic scattering of the light beam is represented by light rays 58 having wavelengths of $\lambda_0$ and $\lambda_1$ within the rejection range as shown by the O.D. versus $\lambda$ plot in FIG. 8. They are reflected in the form of a divergent beam. Inelastic scattering is represented by light rays 60 having wavelength $\lambda_2$ outside the rejection region of the holographic filter 56.

Figure 9D:
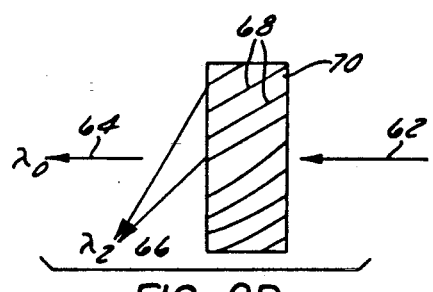

Referring now to FIG. 9D, a concentrating (in transmission) holographic filter of the present invention is depicted. It can be seen that the incoming laser beam 62 is elastically scattered in the direction of light ray 64 ($\lambda_{00}$) and the inelastically scattered light waves are represented by light rays 66 ($\lambda_2$). Not only are light rays 66 scattered in a direction different than that of the elastically scattered light ray 64, the inelastically scattered light rays are focused to a particular point in space by virtue of the curved Bragg surfaces 68 recorded in the holographic filter 70. Such focusing may facilitate detection and measurement of the inelastically scattered light waves which contain information about the chemical structure of the specimen under test.

It should be realized that virtually any Bragg plane structure can be recorded in holographic material in order to scatter either the wanted or unwanted light waves in any desired direction or manner. By way of example, if the spectroscopy of interest is Raman spectroscopy, the filter of the present invention for such an application may preferably be a Raman filter. If the particular application requires a filter having Bragg planes parallel to the surface, a Lippmann holographic filter of the present invention may preferably be used and if slanted Bragg planes are required a non-Snellian holographic filter of the present invention may be used. If focusing, imaging, or diverging operations are required of the filter, the interference fringes of the filter (Bragg surfaces as opposed to planes) can be curved. Such filters are called HOEs. Filter applications requiring the filter to reject two or more different Bragg wavelengths may be satisfied by a filter of the present invention having two sets of interference fringes, this type of filter being a multiplex holographic filter. A broad family of varying HOE and multiplex filters of the present invention are possible.

Furthermore, the incident beam that is filtered may be a laser beam of monochromatic light, a beam of quasi-monochromatic light, or polychromatic light including solar radiation. Filters used with polychromatic light may preferably be used where spectral splitting is desired. A polychromatic beam 71 is illustrated in FIGS. 10A and B wherein spectral band (A, B) 73 comprising wavelengths $\lambda_A < \lambda < \lambda_B$ is the rejection band and can be located in UV, visible, or near-IR ranges or all of them if a sandwich or multiplex filter is employed. By way of example in the near-IR case, $\lambda_A = 700$ nm, $\lambda_B = 1200$ nm, and $\Delta\lambda_{AB} = 500$ nm.

Referring now to FIG. 11A, a Fabry-Perot etalon transmission holographic filter of the present invention is depicted. The holographic filter is designated 72 and has a first coating 74 comprising Bragg planes 80. The transmission characteristics of the holographic Fabry-Perot etalon filter 72 are shown in FIG. 11B which plots O.D. versus $\lambda$. It can be seen that the holographic filter 72 transmits wavelengths around the central wavelengths $\lambda_{01}$, $\lambda_{02}$, etc. The Fabry-Perot etalon holographic filter may basically be a sandwich of two Lippmann filters of the type shown in FIG. 7 or of any other type, coherently coupled. If the rejection peaks designated 82 and 84 in FIG. 11B are recorded close enough together in the holographic material, a transmission filter which transmits the wavelengths in the region between $\lambda_{01}$ and $\lambda_{02}$ can be fabricated.

FIG. 12 shows a multiplex holographic filter of the present invention wherein the rejection peaks of the two combined Lippmann filters are close enough together that the filter can be used as a transmission filter for the wavelengths between the two peaks. Again, the extreme flexibility of holographic fabrication would allow many different Bragg plane sets to be recorded in the holographic material, each Bragg plane set having a different diffraction constant $\Lambda$, such that a multiplicity of wavelengths in different discrete wavelength locations could be rejected, i.e., a series of rejection peaks would be present in an O.D. versus $\lambda$ plot.

The advantages of holograms and holographic filters of the present invention in particular are numerous as outlined below. The optical efficiency of holographic filters can exceed 6.0. Typical O.D.'s for multilayer dielectric filters are about 4.0. Thus, the rejection strength for holographic filters is usually greater than that for multilayer dielectric filters. The bandwidth $\Delta\lambda$ may be controllable from 5 to more than 100 nm if necessary. The peak wavelength $\lambda_0$ may also be controllable and may be tuned within the range 250–3000 nm, or broader. A wide variety of holographic materials can be used to make the holographic filters including DCG, DCG polymer grafts and/or composites, PVA, PMMA, DuPont Photopolymer, and Polaroid DMP-128, as well as many other holographic materials. Additionally, polymer materials having a polymer matrix such as PVA or PMMA and various sensitizers can be used. Typically holographic materials are not transparent for wavelengths greater than 3 microns due to absorption from water (or OH ions) at the vicinity of that wavelength, but holographic materials not containing water or having absorption lines other than at $3\mu$ can be used.

The holographic material for the holographic filter of the present invention preferably meets three requirements: one, transparency in the spectrum of interest; two, sensitivity to some wavelength of laser light used for recording; and three, acceptable resolution. Resolution is determined by the grating constant $\Lambda$ where $\Lambda = \lambda/2\bar{n}$. For example, if $\lambda = 1$ micron and $\bar{n}$ equals 1.5, then $\Lambda$ equals $\frac{1}{3}$ micron. Taking the new equation $F = 1/\Lambda$ where $\Lambda$ equals $\frac{1}{3}$ micron yields a holographic filter having three lines per micron or 3,000 lines per millimeter. If $\lambda$ is decreased to 0.5 microns, $\Lambda$, i.e., resolution, jumps to 6,000 lines per millimeter.

One of the most important advantages of holographic filters of the present invention is the variability of the refractive index profile of the filter. The refractive index of the holographic filter is determined during recording as described supra. The refractive index profile of a holographic filter can be made sinusoidal or quasi-rectangular according to the needs imposed by the particular filter application. Holographic filters can be recorded at low cost either in the sinusoidal or quasi-rectangular refractive index profile unlike multilayer dielectric filters where the cost for a rugate-type filter quickly becomes large. The refractive index profile, whether it be sinusoidal or quasi-rectangular, or in between, may be confirmed by analyzing the harmonics of the holographic filter. The refractive index profile can also be varied by varying its amplitude or height $\Delta n$. $\Delta n$ is shown in FIG. 7 and can be made to vary across the thickness T of the holographic filter 20 shown in that figure. Typically, the amplitude $\Delta n$ may be between 0.001–0.2. This means that the change of refractive index can be made quite extreme causing the material to act very differently from one portion to the next.

Not only can the shape and amplitude of the refractive index profile be changed, but its frequency can also be changed by changing the grating constant $\Lambda$ by changing the spacing between Bragg planes across the thickness T of the holographic filter 20. Finally, the average refractive index $\bar{n}$ can also vary across the width T of the holographic filter 20 and thus the rejection strength of the filter 20 can vary from one portion of the filter to the next. FIGS. 13A and B and C show a few of the possible variations in $\Delta n$, $\bar{n}$ (with some saturation effects), and $\Lambda$, respectively. These many variations, and others made possible through varying recording of the holographic filter, makes the holographic filter of the present invention far more flexible than any state-of-the-art filter.

The reduction of secondary maxima and sidelobes may preferably be accomplished during the course of all processing steps: coating, exposure, and development, the latter including water swelling and alcohol dehydration. These processing steps tend to be surface related. Reduction of sidelobes and secondary maxima is primarily due, however, to shrinking/swelling which creates a vertical nonuniformity of the grating constant equivalent to grating chirp normal to the surface. This effect is observed best in materials that are wet processed such as DCG and DCG/polymer-grafts/composites. From a physical point of view, the sinusoidal distribution of exposure (due to the presence of the standing wave during recording) creates a periodic distribution of hardness differential, then of material density differential, and finally refractive index differential according to the Lorentz-Lorenz formula. B. Born and E. Wolf, Principles of Optics, Pergamon Press (1980) incorporated by reference herein.

Other advantages of the holographic filter of the present invention include variability of the holographic coating thickness, T, between 1–100 microns, material absorption of only $0.2\%/10\mu$ (equivalent to 0.9dB/mm) which can regulated up or down, and the ability to coat single or double curvature substrates made of hard material such as glass or soft materials such polycarbonate, acrylic, or foil coatings. All the coatings can be encapsulated for protection. Resolution of the holographic filter in accordance with the present invention, as discussed above, is typically 6,000 lines per millimeter for $\lambda = 0.5\mu$ or more. Environmentally, the holographic gratings of the present invention can withstand temperatures of $-800°$ C.$-+200°$ C. and have laser damage thresholds of greater than 10J/cm$^2$. Mechanically there is no possibility of interface damage and their elasticity is good. They are also usually resistant to nuclear radiation.

The number of layers N that can be recorded in a holographic filter of the present invention analogous to the layers in a multilayer dielectric filter can be described by the equation $$N = T/\Lambda = 2\bar{n}T/\lambda$$

where N equals the number of layers, T equals the thickness of the holographic coating, and $\Lambda$ is the grating constant. For example, if $\bar{n}$ equals 1.55 and T equals $20\mu$ and $\lambda$ equals $0.5\mu$, then N equals 124 which can be achieved at low cost compared with a 124-layer multilayer dielectric filter of the state of the art.

A theoretical relationship can be drawn between multilayer dielectric filters and the holographic filters of the present invention. This should be useful for designers of multilayer dielectric filters. Taking Abele's theory governing multilayer dielectric structures at normal incidence defined as follows:

$$R_{2N} = \left( \frac{1 - \left(\frac{n_L}{n_1}\right)\left(\frac{n_2}{n_3}\right)^{2N}}{1 + \left(\frac{n_L}{n_1}\right)\left(\frac{n_2}{n_3}\right)^{2N}} \right)^2$$

where $R_{2N}$ equals reflectivity for 2N number of layers, $n_1$, $n_L$ equal the refractive indices of the surrounding media, and $n_2$, $n_3$ equal the refractive indices of alternate layers. Taking the limit of $R_{2N}$ as $N \to \infty$ and for $\Delta n/\bar{n} \ll 1$, we get the following equation:

$$\lim R_{2N} = \tanh^2(v_{79})$$

where $$v_A = N \Delta n/\bar{n}$$

and $$\Delta n = /n_3 - n_2/$$

and $$\bar{n} = \tfrac{1}{2}(n_3 + n_2)$$

Thus, applying the approximation for $N \to \infty$ and $\Delta n/\bar{n}$, we get a formula which is analogous to Kogelnik's equation (for the fundamental frequency of the periodic refraction index distribution) which is the basic equation governing uniform holograms.

In order to determine analytically holographic bandwidths, secondary maxima, etc. Kogelnik's theory adapted to the Lippmann-Bragg case must be studied. Referring to the following equation, $$\eta = \frac{1}{1 + \frac{(1 - \xi^2/\nu^2)}{sh^2(\nu^2 - \xi^2)^{\frac{1}{2}}}}, \quad \text{(Eq. 1)}$$

Eq. 1 defines diffraction efficiency $\rho$ of a holographic filter of the present invention for the general case, where $\xi$ is the off-Bragg parameter defined by the equation $$\xi = 2\pi nT\left(\frac{\cos\theta'}{\lambda} - \frac{1}{\lambda_{BO}}\right) \quad \text{(Eq. 2)}$$

and where $\nu$ is the coupling constant (which represents diffraction power) defined by the equation $$\nu = \frac{\pi \Delta nT}{\lambda_{BO}\cos\theta'} \quad \text{(Eq. 3)}$$

where T is the thickness of the hologram, $\Delta n$ is the amplitude of the refractive index n, $\lambda_{80}$ is the wavelength at normal incidence, and $\theta'$ is the angle of incidence in the medium. Taking equation 1, if $\xi$ is set equal to 0, the equation for $\rho$ becomes $$\rho = \tanh^2 \nu \quad \text{(Eq. 4)}$$

which represents efficiency for the Kogelnik's case which applies to purely phase (non-absorptive) reflection holograms. The on-Bragg condition ($\xi=0$) is defined as the condition where each angle of incidence has a particular wavelength for which the Bragg condition is satisfied and each wavelength has a particular angle of incidence for which the Bragg condition is satisfied and can be illustrated as shown in FIG. 14 depicting the vector $\overline{k}$ of the light wave in the medium where $$k = k_0 = \frac{2\pi n}{\lambda} \quad \text{(Eq. 5)}$$

According to FIG. 14, the Bragg condition can be satisfied by the pair of vectors $\overline{k}'$, $\overline{k_0}')$, $(\overline{k}''$, $\overline{k_0}'')$, etc. directed as in FIG. 14, and satisfying Eq. 5, for the same grating vector K. If the angle of incidence is kept constant and the wavelength $\lambda$ is changed or, vise versa, $\xi \neq 0$ and the off-Bragg case exists.

For the on-Bragg case of $\xi=0$ the equation $\eta = \tanh^2 \nu$ can be plotted as shown in FIG. 15 which plots $\eta$ against $\nu$. Thus, it can be seen that as $\eta$ approaches the theoretical limit of 1, $\nu$, the coupling constant or diffraction power, increases. $\eta$ will be equal to roughly 99% of its full value of 1 when $\nu = \pi$. The Kogelnik theory, it will be remembered, assumes a fully uniform structure, i.e., a structure where the Bragg planes are equidistant from each other as can be seen in FIGS. 16A and B depicting the diffraction constant $\Lambda$ and where the average refractive index $\overline{n}$ and the refractive index modulation $\Delta n$ are the same everywhere.

Assuming the Lippmann case, a correspondence exists between diffraction efficiency $\eta$ and light rejection as shown in the following equation $$R = \eta,$$

where R is reflectivity and $\eta$ is diffraction efficiency. The analogous equation for transmission is $$T = 1 - R - A/S$$

where T is transmissivity, R is reflectivity, and A/S represents absorption and scattering in the holographic material. Given the presence of the A/S factor, this equation can be rewritten as T < 1-R and solved for the following value: R = 99% for which T < 0.01. Recalling the equation for optical density, O.D. = $-\log_{10}$ T, and substituting T < 0.01, we get O.D. > 2.0. Thus, due to the presence of the absorption and scattering characteristics of the medium, the medium will reject more than it will reflect. This is favorable because rejection preferably is as high as possible for a reflection holographic filter of the present invention.

Recalling Eq. 2 which defines $$\xi = 2\pi nT\left(\frac{\cos\theta'}{\lambda} - \frac{1}{\lambda_{BO}}\right) \text{ and Eq. 3 defining}$$

$$\nu = \frac{\pi \Delta nT}{\lambda_{BO}\cos\theta'}$$

where if $\theta = 0$ and $\xi = 0$ then $\lambda = \lambda_{BO}$ which is the Gragg wavelength at normal incidence, and recalling the equation $$\Lambda = \lambda_{BO}/2n$$

then the parenthetical of Eq. 2 must equal 0 and thus, the following equation is derived $$\lambda = \lambda_B = \lambda_{BO} \cos\theta; \xi = 0 \quad \text{(Eq. 6)}$$

Because cosine is not larger than 1 in Eq. 6, that equation becomes $\lambda_B \leq \lambda_{BO}$ which states that the wavelength for the on-Bragg condition is less than or equal to the wavelength for the on-Bragg normal incidence condition. This means that when the angle of incidence is other than normal, i.e., slanted, the Bragg wavelength is shifted to shorter wavelengths. This is known as blue wavelength shift. This effect can be observed by looking at a holographic plate straight on and then looking at it at an angle. Straight on, the plate may look green (longer wavelength), and at an angle, it may look blue (shorter wavelength).

The following equation, $$\lambda = \lambda_{BO} \cos\theta' = 2n\Lambda\cos\theta' = \lambda_R \quad \text{(Eq. 7)}$$

which shows that if while playing back the hologram at a certain angle of incidence, there exists the wavelength $\lambda_B$ (the Bragg wavelength) then this particular angle of incidence and wavelength can be used during recording of the hologram (assuming that processing did not change the Bragg planes). Thus, the recording formula $$\Lambda = \frac{\lambda_R}{2n\cos\theta'} \quad \text{(Eq. 8)}$$

is derived to which Snell's Law applies, $\sin\theta = \overline{n} \sin\theta'$, which relates the angle in the medium to the angle in a vacuum.

Referring back to Eq. 1 and introducing the new variable $$y = \sqrt{v^2 - \xi^2} \quad \text{(Eq. 11)}$$

and squaring both sides, we get $$y^2 = v^2 - \xi^2, \quad \text{(Eq. 10)}$$

and putting Eq. 10 into Eq. 1, we get:

$$\eta = \frac{1}{1 + \frac{1}{v^2} \frac{y^2}{sh^2 y}} \quad \text{(Eq. 12)}$$

where $\xi^2 \leq v^2$. Taking $y \to 0$, i.e., $\xi^2 = v^2$, we get $$\eta = \frac{1}{1 + \frac{1}{v^2}}. \quad \text{(Eq. 13)}$$

Eq. 13 defines the "turning points" of equation 1, that is the points at which Eq. 1 changes from an increasing hyperbolic sine function to a trigonometric sine function.

Another way to define the y=0 turning point is to refer by analogy to the WKB method used in quantum mechanics as explained in the paper J. Jannson, et. al., Solar Control Tunable Lippmann Holowindows, 14 Solar Energy Materials 289-97 (1986), incorporated by reference herein, as is the text on general Kogelnik theroy, Collier Et. Al., Optical Holography, Chapter 9 (1971) and H. Kogelnik, Coupled Wave Theory For Thick Hologram Grating, 48 Bell Syst. Tech. J. 2909 (1969).

Eq. 12 is normally written for the condition of $\xi^2 \leq v^2$ but if $\xi^2 > v^2$, the following equation is used:

$$\eta = \frac{1}{1 + \frac{1}{v^2} \frac{v^2}{\sin^2 y}}. \quad \text{(Eq. 14)}$$

These equations may be illustrated as in FIG. 17 which shows $\eta$ versus $\xi$. The turning points are defined by $\xi = \pm v$ as depicted. In the region between $-v$ and $\pm v$, Eq. 1 contains a sinh function, according to Eq. 12, and outside this region Eq. 1 contains a sin function, according to Eq. 14. Thus, there is a change from a monotonic function (sinh) to an oscillating function (sin) as one progresses outside the boundaries $\pm v$.

The Bragg bandwidth of the holographic filter, assuming normal incidence, can be determined by setting $\theta' = 0$ in Eq. 2 to derive the following equation:

$$\xi = 2\pi n T \left( \frac{1}{\lambda} - \frac{1}{\lambda_{BO}} \right) \quad \text{(Eq. 15)}$$

By making $\theta' = 0$ in Eq. 3, the equation $$v = \frac{\pi \Delta n T}{\lambda} \quad \text{(Eq. 16)}$$

is derived. Note that Eq. is now a function of $\lambda$ and for $\lambda = \lambda_{BO}$, $\xi = 0$. Graphically the, the distance between the turning points $\pm v$ on the $\lambda$ scale may be defined as the Bragg bandwidth. The Bragg bandwidth is defined this way because it is easily identified and the majority of rejection by the holographic filter occurs within this region. By definition, it can be said that $$\Delta \xi = 2v \quad \text{(Eq. 12)}$$

(distance between the turning points). By differentiating Eq. 15, we get $$\Delta \xi = 2\pi n T \frac{1}{\lambda^2} \Delta \lambda. \quad \text{(Eq. 18)}$$

Putting Eq. 18 and Eq. 16 into Eq. 17, we get $$\frac{\Delta \lambda}{\lambda} = \frac{\Delta n}{n}. \quad \text{(Eq. 19)}$$

Now the relationship between bandwidth and the number of layers, N, assuming high diffraction efficiency $\eta$ may be determined as follows. Taking Eq. 4, $\eta = \tanh^2 v$ and Eq. 16, $$v = \frac{\pi \Delta n T}{\lambda}$$

and setting $v = \pi$, we get $\eta = 99\%$. As discussed spura, $\eta = 99\%$ yields an O.D. value greater than 2. Setting $v = \pi$ in Eq. 16 yields the relationship $$\Delta n = \Delta n_0 = \frac{\lambda}{T} \quad \text{(Eq. 20)}$$

which defines the minimum index of refraction amplitude in order to achieve $\eta = 99\%$ (.e., O.D.>2). Putting Eq. 20 ion Eq. 19, we derive the relationship between bandwidth and holographic thickness assuming 99% efficiency:

$$\frac{\Delta \lambda}{\lambda} = \frac{\lambda}{nT}. \quad \text{(Eq. 21)}$$

$\Delta \lambda$ may be related to the number of layers in the hologram as shown by the equation $$N = \frac{T}{\Lambda} = \frac{T}{\lambda/2n} = \frac{2nT}{\lambda}. \quad \text{(Eq. 22)}$$

Now solving Eq. 22 and $\overline{n}T$ and inserting that into Eq. 21, we get the equation $$\frac{\Delta \lambda}{\lambda} = \frac{2}{N}. \quad \text{(Eq. 23)}$$

Eq. 23 shows that if a narrow bandwidth is desired as well as a high O.D., a large number of layers in the filter must be used. This is what multilayer dielectric filters cannot afford due to their high cost with increasingly large numbers of layers. The holographic filters of the present invention provides them with ease and low cost.

Referring now to the table in FIG. 18, various values for T, N, and $\Delta \lambda$ are given for $\lambda_B 0.5\mu$. It can be seen that 200 layers are required in order to achieve $\Delta \lambda = 5$ nm which is extremely difficult for multilayer dielectric filters. In contrast, the holographic filter of the present invention may be recorded with all of these layers in just one recording step.

Recall now the three fundamental advantages of the holographic filters of the present invention: narrow $\Delta \lambda$ (and large N), high O.D. (because T is very large due to large N which causes $\Delta n$ to be small and easy to record), and finally suppression of secondary maxima. With regard to the latter advantage, it will now be shown that secondary maxima for the holographic filter of the present invention are of little affect. Referring now again to Eq. 14, $$\eta = \frac{1}{1 + (1/v^2)(y^2/\sin^2 y)}$$

we can calculate the approximate position of the secondary maxima. As we know that $\eta$ is large for the secondary maxima (see FIG. 17), the $y^2/\sin^2 y$ factor of Eq. 14 must have local minima. Setting $$h = \frac{\sin y}{y},\quad \text{(Eq. 24)}$$

sin y must approximately approach the value 1 so that h is as large as possible. We look for the $\eta=0$ point because it is known from FIG. 17 that before the secondary maxima is reached, know that the position of the first 0 is farther than the position of the turning point $\xi=\pm v$.

The position of the turning point is $y=0$ in the equation $y=\sqrt{v^2-\xi^2}\quad v^2-\xi^2$ (Eq. 25)

for the turning point, referring now to FIG. 19 where a sin function is shown, sin y versus y, we can plot the position of the first turning point in FIG. 19 at the point $y=0$ which is at the origin of the siny versus y curve. The first 0 can also be plotted at the point $y=90$ as shown. The first secondary maxima which is known to be at a location $y>\pi$ can be plotted approximately at $$y = y_1 = 3\pi/2 \quad \text{(Eq. 26)}$$

Since $y=\sqrt{\xi^2-v^2}=y_1$ and $v$ is basically a constant, we can write $$\xi^2_1 = y^2_1 + v^2 \quad \text{(Eq. 27)}$$

where $Y^2$ is essentially fixed by Eq. 26 at $3\pi/2$ and where $v^2$ is fixed at $\pi$ and still keeping $\eta=99\%$ we can write $$\xi^2 = \xi_1^2 = (3\pi/2)^2 + \pi^2 = \frac{13\pi^2}{4}. \quad \text{(Eq 28)}$$

Now taking Eq. 18, $$\xi_1 = \frac{2\pi n T \Delta\lambda_1}{\lambda^2},$$

and substituting in Eq. 5, we get $$\xi_1 = \frac{\pi T \Delta\lambda_1}{\Lambda \lambda_B}. \quad \text{(Eq. 29)}$$

Because $\xi_1$ is a constant as in Eq. 28, if T is increased then the $$\frac{\Delta\lambda_1}{\lambda_B}$$

factor must be decreased and because $\Delta\lambda_1 = \lambda_1 - \lambda_B$, this means that the positions of all maxima on the $\lambda$ scale come closer to the Bragg wavelength $\lambda_B$. See FIGS. 21A and B where the maxima in 21A are shown compressed in 21B. Then, by increasing T we can force the maxima of the $\eta$ versus $\lambda$ curve together making them of lesser effect in the holographic filtering system.

Finally, it can be seen that further increasing T improves all three general advantages of the holographic filter of the present invention for the fully uniform case assuming no absorption. Recall that T is increased by increasing the number of layers, N, which for a holographic filter of the present invention is routine and for state of the art filters is virtually cost prohibitive at large N.

Above, the advantages of holographic mirrors versus multilayer dielectrics were set out assuming a fully uniform Kogelnik model. The term secondary maxima is discussed here in the context of the fully uniform model. Additional advantages are derived, however, from the fact that additional degrees of freedom can be achieved by varying the diffraction constant, $\Lambda$, the refractive index bias, $\bar{n}$, and the amplitude of the refractive index, $\Delta n$, as a function of z. One such advantage is suppression of maxima or sidelobes of the filter. Sidelobes is used to generally describe secondary maxima for both the uniform and nonuniform cases.

State-of-the-art multilayer rugate filters have achieved on a theoretical basis only suppression of secondary maxima by making the refractive index amplitude nonuniform. See W. Southwell, Using Apodization Functions to Reduce Sidelobes in Rugate Filters, 28 Appl. Opt. 5091 (1989). Realizing such a nonuniform rugate filter is not only expensive, but making the refractive index amplitude nonuniform is usually only of secondary effect compared to the grating constant nonuniformity effect.

Figure 21B:
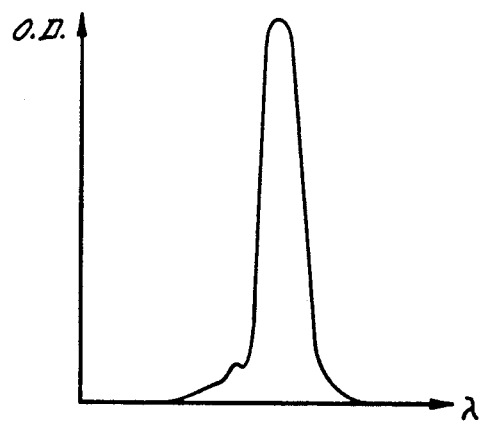

Assuming a Lippmann-Bragg holographic mirror with chirp normal to the surface, namely grating constant nonuniformity represented by Eq. 19 can be generalized to the form:

$$\frac{\Delta\lambda}{\lambda} = \frac{\Delta n}{n} + \frac{\Delta\Lambda}{\Lambda} \quad \text{(Eq. 30)}$$

where $\Delta\Lambda/\Lambda$ determines the relative variation of the grating constant and is for correction of secondary maxima and sidelobes. Since this term is approximately equivalent to the Bragg wavelength shift in the form:

$$\frac{\Delta\Lambda}{\Lambda} = \frac{\Delta\lambda_B}{\lambda_B} \quad \text{(Eq. 31)}$$

the secondary maxima are partially suppressed by an averaging effect as is shown in FIGS. 21B. FIG. 21B illustrates typical experimental wavelength characteristics for holographic Lippmann filters. Comparing this Figure with 20A for the uniform case, it can be seen that the secondary maxima have been suppressed due to the combination of a number of additional effects such as nonuniformity of $\Lambda$, nonuniformity of $\Delta n$, nonuniformity of $\bar{n}$, and material absorption of the hologram. This is especially advantageous for filter spectroscopic and spectral splitting applications.

It was noted earlier that the holographic filter for spectroscopic applications usually has a very narrow wavelength characteristic. This characteristic could cause the angle of acceptance of the holographic filter to be narrow and should be accounted for during system design. If the blue shift of a holographic filter of the present invention is studied according to the following equation (for $\theta' \ll 1$)

$$\lambda_B = \lambda_{BO} \cos\theta' = \lambda_{BO}\left(1 - \frac{\theta'^2}{2}\right) \quad \text{(Eq. 32)}$$

which can be simplified to $\Delta\lambda_B = \lambda_{BO}\theta'^2/2$, we obtain the following formula defining filter angular acceptance:

$$\theta' = \sqrt{\frac{2\Delta\lambda_B}{\lambda_{BO}}} \quad \text{(Eq. 33)}$$

Thus, the filter of the present invention can be used to reject not only a particular $\lambda$ but a particular direction of incident light. If $\Delta\lambda_B$ is too broad, desired wavelengths might be rejected. If $\Delta\lambda_B$ is too narrow, however, according to Eq. 30, angular acceptance might be too narrow. Thus $\Delta\lambda_B$ may preferably be optimized by nonuniform shrinking/swelling during processing. At the same time, because an incident laser beam is highly directional, the limited angular acceptance usually does not restrict filter applicability.

Other embodiments of the present invention may provide for curved filters adjusted to the symmetry of a particular beam as is shown in FIG. 22 where an incident beam is designated 99, a scattering medium is indicated at 100, a filter is indicated at 102, and a detector is designated 104. In another embodiment as shown in FIG. 23, an incident laser beam 106 can be diverged by lens system 108 to be scattered by medium 110. In this case the filter curvature 112 should be adjusted to the geometry of the beam wavefront.

We can generalize the basic concept of holographic spectroscopic filters by sandwiching a number of elementary filters of the present invention with grating constants $\Lambda_1$, $\Lambda_2$, $\Lambda_3$ as shown in FIG. 24. Since $\Lambda = \lambda/2\bar{n}$, such compound filters will reject three windows around wavelengths $\lambda_{01}$, $\lambda_{02}$, $\lambda_{03}$. Another embodiment of the present invention would provide for a scattering system as shown in FIG. 25 where direct laser beam energy is reflected off of a filter 114 and onto a scattering medium 116 the waves from which reflect back toward the filter, the filter allowing only the rays $\lambda \neq \lambda_0$ through to the detector 118.

It is to be understood that embodiments of the present invention not disclosed herein are fully intended to be within the scope of the claims.

We claim:

1. A spectroscopic system for determining the characteristic wavelengths of a scattering medium, the system comprising a source for a laser beam of wavelength $\lambda_O$, the laser beam incident upon the scattering medium, the scattering medium scattering the laser beam into characteristic wavelengths $(\lambda_1 + \lambda_2 + \lambda_3 \ldots)$; a Lippmann Bragg hologram which rejects, by reflection, the wavelength $\lambda_0$ scattered from the scattering medium; and means for detecting the wavelengths unrejected by the hologram.

2. A spectroscopic system for determining the characteristic wavelengths of a scattering medium in which a light beam of wavelength $\lambda_O$ is incident upon and scattered from the scattering medium into characteristic wavelengths $(\lambda_1 + \lambda_2 + \lambda_3 \ldots)$, the system comprising:
   a source for the light beam;
   a volume holographic Lippmann Bragg filter positioned to receive light scattered from the scattering medium, the filter rejecting light of wavelength $\lambda_0$ and transmitting the characteristic wavelengths;
   means for detecting the transmitted wavelengths.

3. The system as defined in claim 2 wherein the light beam is a laser beam.

4. The system as defined in claim 2 wherein the light beam is quasi-monochromatic.

5. A spectroscopic system for determining the characteristic wavelengths of a scattering medium in which light having wavelength $\lambda_O$ is incident upon and scattered from the scattering medium into characteristic wavelengths $(\lambda_1 + \lambda_2 + \lambda_3 \ldots)$, the system comprising:
   a source for the light of wavelength $\lambda_0$;
   a volume holographic Lippmann Bragg filter positioned to receive light scattered from the medium, the filter rejecting scattered light of wavelength $\lambda_0$ and transmitting the characteristic wavelengths;
   means for detecting the transmitted wavelenghts.

6. A Raman spectroscopic system for determining the characteristic wavelenghts of a scattering medium in which light having wavelength $\lambda_0$ is incident upon and scattered from the scattering medium into characteristic wavelenghts $(\lambda_1 + \lambda_2 + \lambda_3 \ldots)$, the system comprising;
   a source for the light of wavelength $\lambda_0$;
   a volume holographic Lippmann Bragg filter positioned to receive light scattered from the medium, the filter rejecting scattered light of wavelength $\lambda_0$ and transmitting the characteristic wavelenghts;
   means for detecting the transmitted wavelenghts.

* * * * *

UNITED STATES PATENT AND TRADEMARK OFFICE
CERTIFICATE OF CORRECTION

PATENT NO. : 5,153,670
DATED : Oct. 6, 1992
INVENTOR(S) : Jannson et al.

It is certified that error appears in the above-identified patent and that said Letters Patent is hereby corrected as shown below:

Col. 7, line 41, delete "$(\lambda_{00})$" and substitute therefore --$(\lambda_0)$--.
Col. 11, line 27, delete "$\lambda_{80}$" and substitute therefore --$\lambda_{B0}$--.
Col. 12, line 29, delete "Gragg" and substitute therefore --Bragg--.
Col. 13, line 4, delete "$y=\sqrt{v^2-\xi^2}$" and substitute therefore --$y=\sqrt{v^2-\xi^2}$--.
Col. 13, line 64, after "Eq." insert --15--.
Col. 14, line 32, after "(" insert --i--.
Col. 14, line 33, delete "ion" and substitute therefore --into--.
Col. 14, line 59, delete "$\lambda_B 0.5\mu$" and substitute therefore --$\lambda_B=.5\mu$--.
Col. 15, line 21, delete "know".
Col. 15, line 25, after "$y=\sqrt{v^2-\xi^2}$" insert --which yields--.
Col. 15, line 25, '$v^2-\xi^2$ (Eq. 25)" should stand alone on its own line.
Col. 15, line 31, delete "90" and substitute therefore --$\pi$--.
Col. 15, line 36, delete "$y=\sqrt{\xi^2-v^2}=y_i$" and substitute therefore --$y=\sqrt{\xi^2-v^2}=y_i$--.

Signed and Sealed this

Nineteenth Day of October, 1993

Attest:

BRUCE LEHMAN

Attesting Officer     Commissioner of Patents and Trademarks